(12) United States Patent
Sharp et al.

(10) Patent No.: US 10,318,589 B2
(45) Date of Patent: Jun. 11, 2019

(54) DETECTION AND DISPLAY OF VOLATILE DATA

(75) Inventors: Kathleen Sharp, Winchester (GB); Colin C. Stone, Romsey (GB); Joseph R. Winchester, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 2140 days.

(21) Appl. No.: 13/233,830

(22) Filed: Sep. 15, 2011

(65) Prior Publication Data

US 2012/0072444 A1 Mar. 22, 2012

(30) Foreign Application Priority Data

Sep. 20, 2010 (EP) .................................... 10177526

(51) Int. Cl.
| | | |
|---|---|---|
| *G06F 7/00* | (2006.01) | |
| *G06F 16/904* | (2019.01) | |
| *G06F 16/2458* | (2019.01) | |
| *G06F 3/0481* | (2013.01) | |
| *G06F 3/0485* | (2013.01) | |

(52) U.S. Cl.
CPC .......... *G06F 16/904* (2019.01); *G06F 3/0481* (2013.01); *G06F 3/0485* (2013.01); *G06F 16/2477* (2019.01)

(58) Field of Classification Search
CPC ......... G06F 17/30994; G06F 17/30551; G06F 3/0481
See application file for complete search history.

(56) References Cited

U.S. PATENT DOCUMENTS

| | | | | |
|---|---|---|---|---|
| 5,870,759 | A * | 2/1999 | Bauer et al. | |
| 6,505,214 | B1 * | 1/2003 | Sherman et al. | |
| 7,610,351 | B1 * | 10/2009 | Gollapudi | H04L 67/2847 707/999.002 |
| 7,703,043 | B2 | 4/2010 | Utsuki et al. | |
| 7,908,566 | B2 * | 3/2011 | Wilcox | G06F 3/0485 715/712 |
| 2002/0194205 | A1 * | 12/2002 | Brown et al. | 707/200 |
| 2005/0015712 | A1 * | 1/2005 | Plastina | G06F 17/30038 715/230 |
| 2006/0015539 | A1 * | 1/2006 | Wolf et al. | 707/201 |
| 2006/0235933 | A1 * | 10/2006 | Baluja | G06Q 10/107 709/207 |

* cited by examiner

*Primary Examiner* — Paul Kim
(74) *Attorney, Agent, or Firm* — Winstead, P.C.

(57) ABSTRACT

A method, system and computer program product for detecting and displaying potentially volatile data. A metadata store, which is attached to a data store, is used for storing metadata corresponding to the stored data. A data retrieval component is used for retrieving a first and a second subset of data from the data store. Furthermore, a metadata retrieval component is used for retrieving a first and a second subset of the metadata corresponding to the first and second subsets of data from the data store. In addition, a comparator is used for comparing the first and the second subsets of the metadata. Additionally, a display control component, responsive to the comparator, is used for varying an indicator associated on a display with the first subset of data or the second subset of data to indicate an inconsistency between the first subset of metadata and the second subset of metadata.

14 Claims, 8 Drawing Sheets

DETECTION AND DISPLAY OF VOLATILE DATA

CROSS-REFERENCE TO RELATED APPLICATIONS

This application claims priority under 35 U.S.C. § 119(a) from European Patent Application No. 10177526.0, filed on Sep. 20, 2010, the contents of which are incorporated herein by reference.

TECHNICAL FIELD

The present invention relates to the field of graphical user interfaces, and more particularly, to detecting and displaying volatile data among data retrieved for display in a graphical user interface so that a user is quickly and efficiently made aware of the volatility of the data.

BACKGROUND

In known graphical user interfaces according to the art, scroll bars are used when the available data is larger than the size of the visible window given to the control. For controls that contain rows of data, such as tables or lists of items, a common scenario is for the application to show the user the amount of available data by the size of the scroll bar thumb as a percentage of the total available size in which the thumb can move (the size of the scroll bar) and as the user moves the scroll bar, the rows in the control change to show the rows in the visible window from the total number of rows, as represented by the position of the thumb relative to the total size of the scroll bar. Scroll bars to allow paging through lists of data are well described in the patent literature and are used in familiar windowing software to show files within a folder where the user can move the scrollbar to see items off the page currently being displayed.

Figure 3:
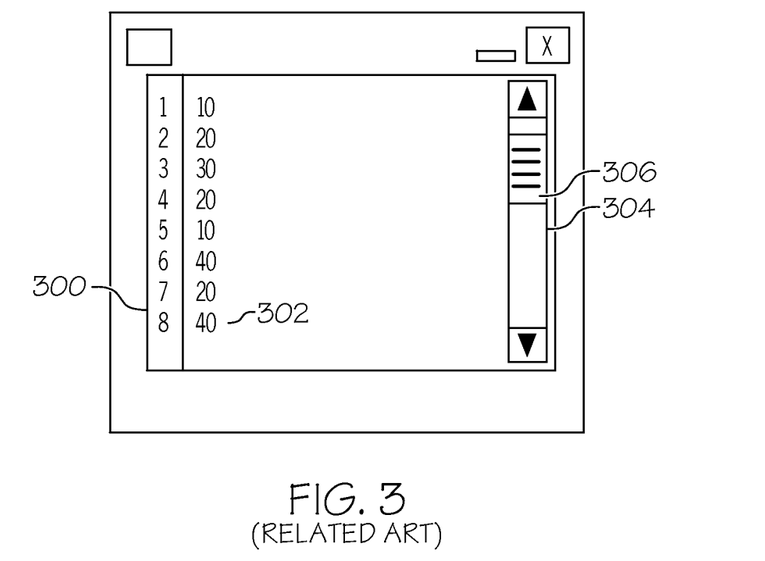
FIGS. 3-4 illustrate the shortcomings in retrieving and displaying data in a graphical user interface window.

An example of a graphical user interface window is shown in FIG. 3, wherein the salient features are the line numbers 300 indicating the rows of data 302 being displayed, the scrollbar 304, and the thumb 306, which is well known in the art as a means adapted to be captured by, for example, the mouse and slide down the scrollbar 304 to bring into view additional rows of data 302.

A problem exists where the total data through which the user is scrolling is a set of data collected from a data store at different points in time and that data can change over time. The effect of this is that rows retrieved in one fetch are not necessarily coherent with rows retrieved in a later fetch. This occurs typically if the application cannot, for performance reasons because of bandwidth and other client/server issues, fetch all of the rows at once from the data store. In these situations what typically occurs is that if the total number of available rows can be initially quickly retrieved, items are only retrieved from the data store to fulfill the request to display the rows to the user in the visible area of the control plus some additional rows for "headroom". As the user scrolls the control, the application realizes that the rows that need to displayed are not yet in the application, so a fetch to the back-end data store occurs to retrieve the data to create the rows. The effect for users is that they can see quickly the amount of possible rows and the data for the rows in the visible window of their application, with the request being satisfied quickly as only a subset of the total available rows are fetched. If the user scrolls the tree, more rows are retrieved only as required, the net effect being a performance improvement over fetching all of the back end data and turning it into rows at once when the application initially shows the available rows.

However, this performance improvement itself introduces a problem by paging data lazily into a tree because the data for different pages is retrieved at different times determined by when the user scrolls the control. If the data can change over time, then the list being presented to the user is not a coherent set of data relative to itself.

One real world scenario where this occurs is if the rows represent operating system resources, such as files, and the data attribute being compared is a time of last update, or, for a list of processes, where the data attribute is a task priority, memory size or elapsed time. It will be clear to one of ordinary skill in the art that decisions based on comparisons of this potentially volatile data will be at least occasionally erroneous.

Figure 4:
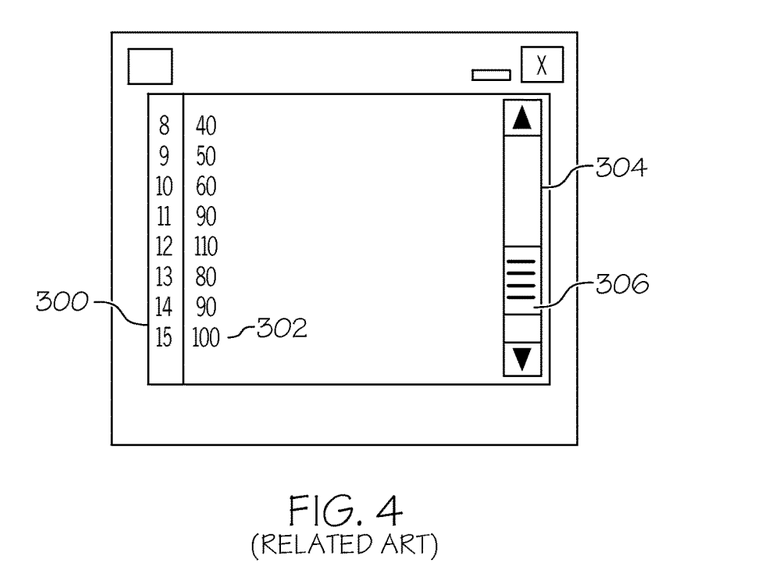

Consider, for example, FIG. 4, in which thumb 306 has been slid down scrollbar 304 to bring into view further rows of data 300, as shown by the change in rows of data 300, where row number 8 from the bottom of the previous display of FIG. 3 is now at the top and additional rows 9 to 15 are shown. If data from any of these additional rows was changed between the time of the original display for FIG. 3 and the time of the scrolled display of FIG. 4, this fact would not be known to the user, and erroneous decisions based on the data might be made.

BRIEF SUMMARY

In one embodiment of the present invention, a method for detecting and displaying potentially volatile data comprises storing metadata corresponding to data in a data store. The method further comprises retrieving a first subset of data from the data store. Additionally, the method comprises retrieving a first subset of the metadata corresponding to the first subset of data from the data store. Furthermore, the method comprises retrieving a second subset of data from the data store. In addition, the method comprises retrieving a second subset of the metadata corresponding to the second subset of data from the data store. The method further comprises comparing the first and the second subsets of the metadata. Additionally, the method comprises responsive to the comparing, varying, by a processor, an indicator associated on a display with the first subset of data or the second subset of data to indicate an inconsistency between the first subset of metadata and the second subset of metadata.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

As described in the Background section above, a problem exists where the total data through which the user is scrolling in a window interface is a set of data collected from a data store at different points in time and where that data can change over time. The effect of this is that rows retrieved in one fetch are not necessarily coherent with rows retrieved in a later fetch. This occurs typically if the application cannot, for performance reasons because of bandwidth and other client/server issues, fetch all of the rows at once from the data store. In these situations what typically occurs is that if the total number of available rows can be initially quickly retrieved, items are only retrieved from the data store to fulfill the request to display the rows to the user in the visible area of the control plus some additional rows for "headroom". As the user scrolls the control, the application realizes that the rows that need to displayed are not yet in the application, so a fetch to the back-end data store occurs to retrieve the data to create the rows. The effect for users is that they can see quickly the amount of possible rows and the data for the rows in the visible window of their application, with the request being satisfied quickly as only a subset of the total available rows are fetched. If the user scrolls the tree, more rows are retrieved only as required, the net effect being a performance improvement over fetching all of the back end data and turning it into rows at once when the application initially shows the available rows.

However, as described in the Background section above, this performance improvement itself introduces a problem by paging data lazily into a tree because the data for different pages is retrieved at different times determined by when the user scrolls the control. If the data can change over time, then the list being presented to the user is not a coherent set of data relative to itself.

One real world scenario where this occurs is if the rows represent operating system resources, such as files, and the data attribute being compared is a time of last update, or, for a list of processes, where the data attribute is a task priority, memory size or elapsed time. It will be clear to one of ordinary skill in the art that decisions based on comparisons of this potentially volatile data will be at least occasionally erroneous.

Figure 1:
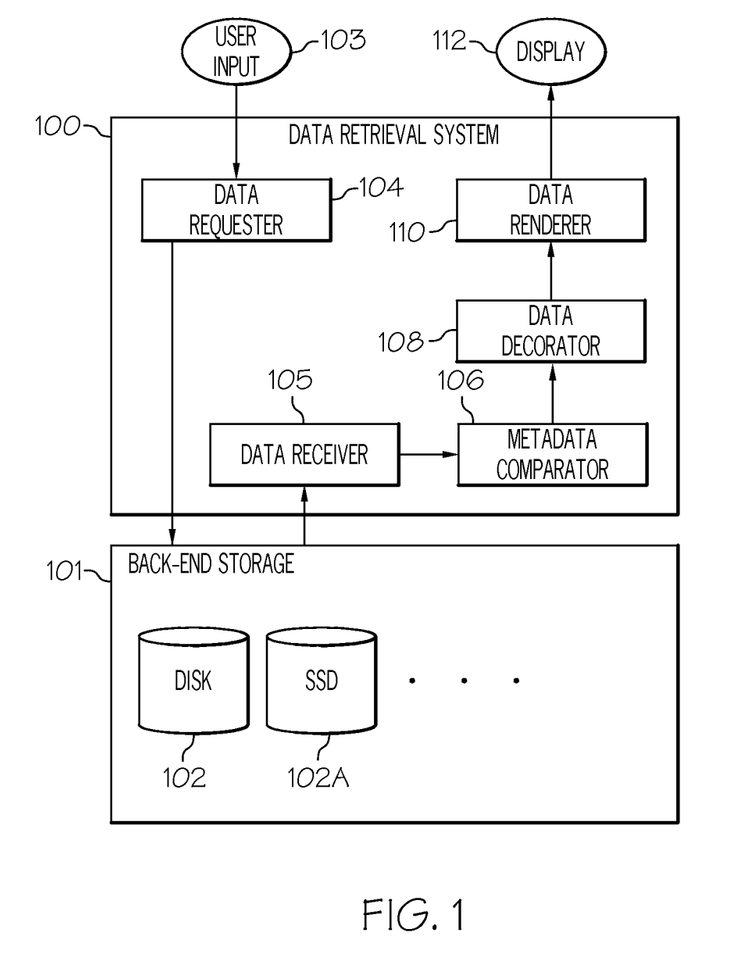
FIG. 1 illustrates a schematic form of a system or arrangement of components for practicing the principles of the present invention in accordance with an embodiment of the present invention.

Referring now to the Figures in detail, FIG. 1 shows in schematic form a system or arrangement of components for practicing the principles of the present invention according to an embodiment of the present invention. FIG. 1 shows a data retrieval system 100 responsive to user input 103 to data requester 104 to retrieve data from back-end storage 101, which might comprise, for example, disk storage 102 and solid-state storage device 102A. It will be clear to one of ordinary skill in the art that other forms of storage may also be used, for example, tape storage, and that some or all of the storage may be virtualized by means of virtual storage appliances and the like. Data receiver 105 receives data from back-end storage 101, and, rather than passing the data immediately to be displayed by display 112, passes the data to metadata comparator 106. Metadata comparator 106 is operable to compare metadata, such as the time of retrieval or of last update of the data and to provide the results of its comparison to data decorator 108, which determines the appropriate decoration for the data according to the comparisons performed by metadata comparator 106. Data decorator 108 then provides the retrieved data and an indicator for each data item of the decoration to be used to data renderer 110, which is operable to render the data accordingly before passing it to display 112. "Decoration" of data is a well-known term in the art referring to the provision of additional metadata and indicators to control further processing or display options related to the data.

Figure 2:
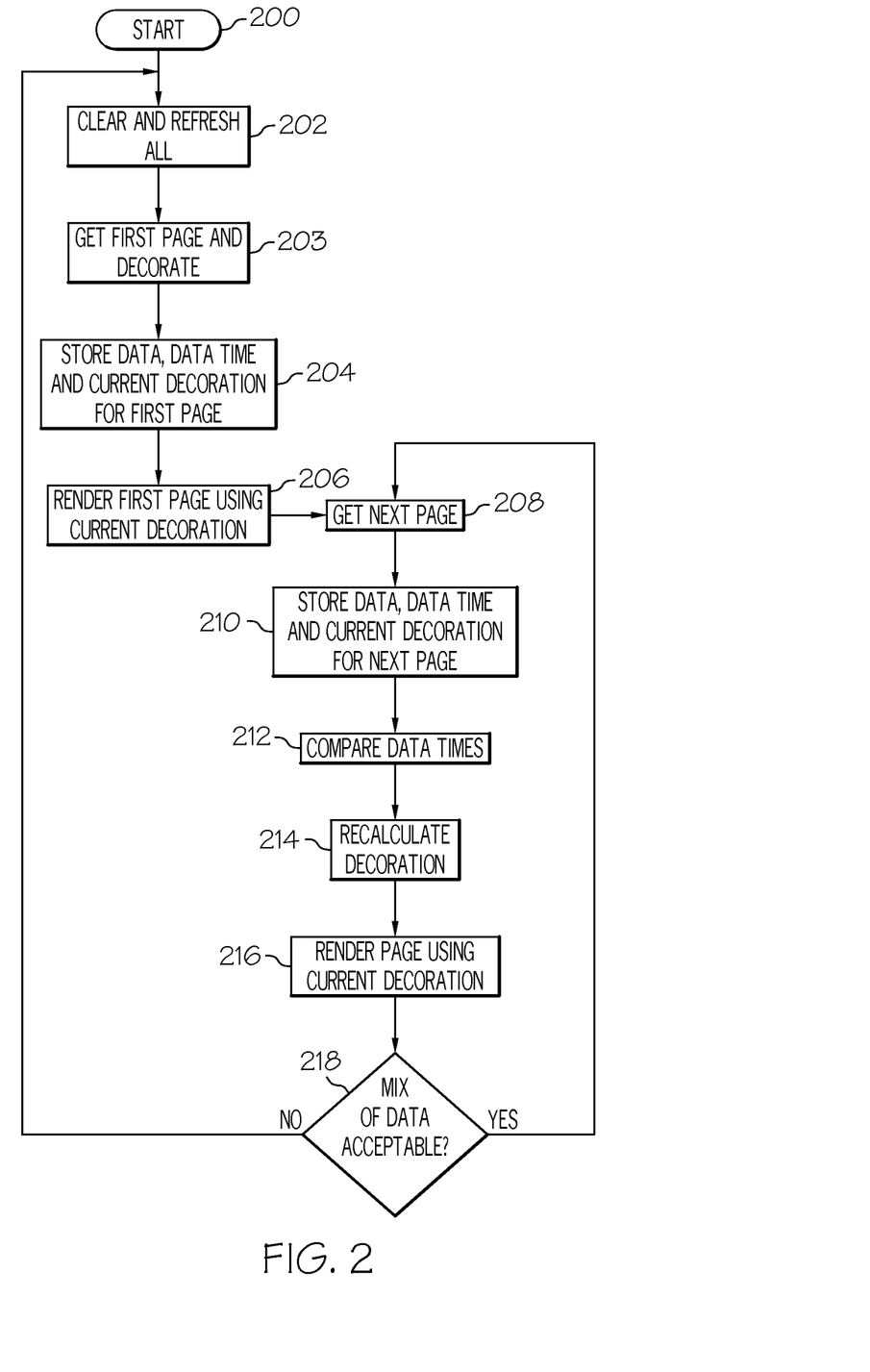
FIG. 2 is a flowchart of a method for detecting and displaying potentially volatile data in accordance with an embodiment of the present invention.

Turning now to FIG. 2, there is shown in a flowchart form a method or logic arrangement for detecting and displaying potentially volatile data according to an embodiment of the present invention. The method begins at START step 200, and at step 202, the data is completely cleared and may be refreshed completely. This step is frequently used for the display of data that is known to be volatile. Disadvantageously, there is a performance impact associated with this refreshing of the data, as has been previously noted. At step 203, a first page is acquired and decorated as described with reference to FIG. 1 above, by data decorator 108. At step 204, the data and metadata, such as the data time (which may be, for example, the time of retrieval or the time of last update) and current decoration, are stored for the data retrieved for the first page since the clear and refresh step 202. At step 206, the data is rendered for display on a user interface using the current decoration. At step 208, responsive to a user scrolling the data in the interface, and the requirement to retrieve further data to populate the newly-scrolled data rows for display, the next page is retrieved, and at step 210, the data and metadata, such as the data time and current decoration, are stored for the next page. At step 212, a comparator 106 compares the data time metadata, and then, at step 214, causes the data decorator 108 to recalculate all the data decorations for the data to be displayed. At step 216, the data to be displayed is rendered by data renderer 110 and displayed by display 112. At test step 218, the user is offered the opportunity to determine, on the basis of the decorated data display, whether the mix of data is acceptable and not potentially misleading by virtue of its unacceptable volatility, and can then choose to return to clear and refresh step 202 or to return to get the next page at step 208.

In some implementations, the method of FIG. 2 may include other and/or additional steps that, for clarity, are not depicted. Further, in some implementations, the method of FIG. 2 may be executed in a different order presented and that the order presented in the discussion of FIG. 2 is illustrative. Additionally, in some implementations, certain steps in the method of FIG. 2 may be executed in a substantially simultaneous manner or may be omitted.

A worked example of the operation of the system or method according to one embodiment is shown, starting at FIG. 3, as described in the Background section above: there are 20 available rows to retrieve and the application has made the decision for performance reasons to fetch the first 10 rows. FIG. 3 shows rows 1 to 8 being visible. Rows 9 and 10, although they have been retrieved, are off the visible window, and rows 11 to 20 have not been retrieved yet. The number being shown may represent some volatile data that is accumulating over time, such as an elapsed number of seconds. After some time has elapsed, the user moves the scrollbar down as shown in FIG. 4. The application detects that it must get the next page of data and fetches rows 11 to 20 from the back end data store. However, the volatile data has changed during the period intervening, and so in rows 11 to 20 it is, in this example, higher by some amount.

As illustrated in FIG. 4, the user sees the data which is in the range 10 to 60 for rows 1 to 10, and the range 90 to 110 for newly-displayed rows 11 to 15. The user might make a decision comparing rows fetched during one page of data with rows fetched during another without the knowledge of the fact the data is inconsistent relative to itself, because of the intervening update activity affecting rows 11 to 15.

An embodiment of the present invention thus comprises a technique whereby the age of data items is iteratively detected and compared, and a margin ruler or other "decoration" is used to indicate the relative age of items in a list, or other, control so the user can see, for the retrieved data, its relative age next to other pages of data retrieved at other times. This allows users to be aware of the mixed age of the data and to make more informed decisions about how different rows relate to each to other with respect to data on those rows that can change over time, such as dates, sizes, or other volatile attributes.

Figure 5:
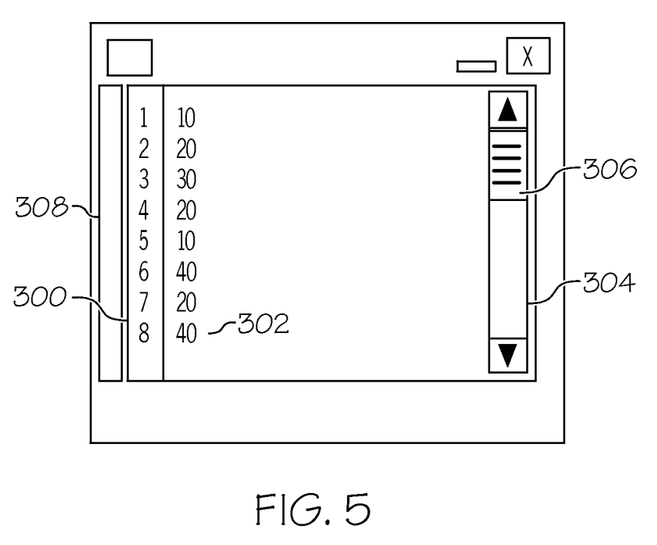
FIGS. 5-7 illustrate applying the principles of the present invention to an illustrative graphical user interface window in accordance with an embodiment of the present invention.
Figure 6:
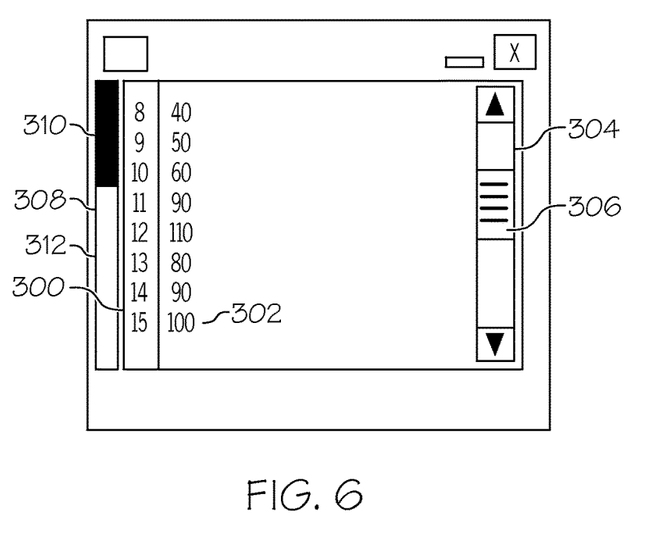

In one embodiment, there is provided a ruler, shown as element 308 in FIGS. 5 and 6 on the left hand side, which shows the relative age of items in the list. In one embodiment, the color white is used to show the most recent set of data, and black the oldest. In one embodiment, shades of RGB grey are used to show ages in between, and so, for example, for three discrete subsets of data, white RGB(255, 255,255), grey RGB(128,128,128) and black RGB(0,0,0) may be used. For four discrete subsets of data, white RGB(255,255,255), grey(170,170,170), grey RGB(85,85, 85), and black RGB(0,0,0) may be used, and so forth with as many shades of grey created as required (up to 256, in one embodiment) to show the relative age of the retrieved items.

It will be clear to one of ordinary skill in the art that many other forms of "decoration" of the data items may be used, rather than the simplified embodiment using a colored ruler 308 beside the data rows 302. For example, the data rows on the display may themselves by displayed in color-coded form, or a clock showing a time of retrieval or last update may be displayed beside each data item.

FIG. 5 shows the user, according to an embodiment of the present invention, that the data being displayed is all a coherent set, as the ruler is solid and the same color, and that this data is the most recent data in the list as it is white.

FIG. 6, after the user has scrolled down to see rows 8 to 15, shows the user, according to an embodiment of the present invention, that this is a mixed set of data, as indicated by the coloring of the ruler 308 into two portions: a white portion 312 and a black portion 310. The white data, the most recent, is now on the bottom. The ruler on the left shows that the boundary between the mixed age data—the oldest and the youngest data—is between rows 10 and 11. The user now has knowledge that any volatile data that might have changed between the two pages of data that have been retrieved need to be treated as inconsistent.

Figure 7:
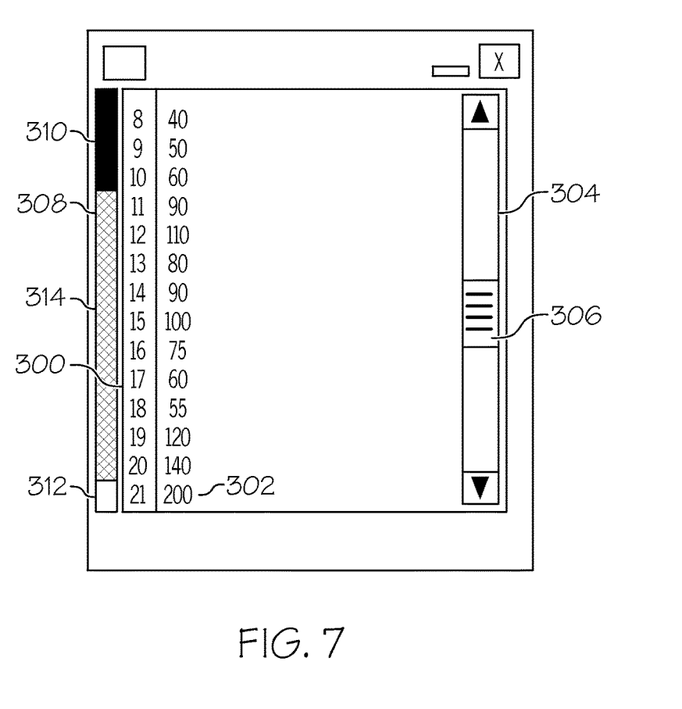

FIG. 7 illustrates further the proposed solution, according to an embodiment of the present invention, based on a total of 30 rows. These have been retrieved from the back end data store in 3 pages of 10 as the user has scrolled down—the bottom item 21 is from the most recent page, shown as white RGB(255,255,255), the top items 8 to 10 are from the first and oldest page, shown as black RGB (0,0,0), and the middle rows 90 to 140 are from the 2nd page and shown as grey RGB(128,128,128).

One particular advantage of the present invention is that it allows the paging of back end data, which helps performance, yet allows the user to see which rows in a tree were retrieved in which pages relative to other rows, and thereby to receive help with any interpretation of the data represented by the rows relative to other rows for data which is volatile and might be inconsistent. Data which is not volatile, such as home addresses or dates of birth, can be considered differently. This knowledge helps the user to either avoid making misinterpretations of the data, or else having to fully refresh all of the data before making a decision.

In one embodiment, the principles of the present invention work by having knowledge of the time of retrieval or the time of last update of each row of data. One exemplary embodiment may use the attribute data of widget items, although other embodiments could use other programming techniques such as arrays or hash maps to determine which row was retrieved at what time.

In one embodiment, there are two pieces of logic used for the principles of the present invention to work. The first is that the system has information indicating when each row was retrieved relative to the others, so the application is able to determine for a given row whether it is the oldest, the newest, or a member of another intermediate set where it lies relative to the oldest and newest. One exemplary technique for this relative age detection is to store an ordered map where a key entry is created for each fetch request, and the data is the relative time of the fetch. Each row of data points to a key in the ordered map.

The second is to provide a system whereby data items in a user view can be "decorated" to indicate their relative age as the scrolled data is rendered; in one embodiment, this is achieved by providing a ruler that can draw area of color based on which rows are being displayed in the control. Marker ruler margins are used in known graphical user interfaces to display information such as breakpoints or other static line annotations in source code viewers typically found in frameworks, such as Eclipse. One exemplary embodiment uses one of these associated with a JFace document viewer. For any visible row, the key entry in the map is retrieved, and, based on where this was in the map, the color used for the row is determined: white for the end, black for the beginning, and a shade of grey in between. The shades of grey available may vary according to the underlying system and display capabilities. One example is the use of an RGB(n,n,n) encoding where n is:

$$256*(\text{index in the map}/(\text{total number of rows in the map}-1)).$$

Figure 8:
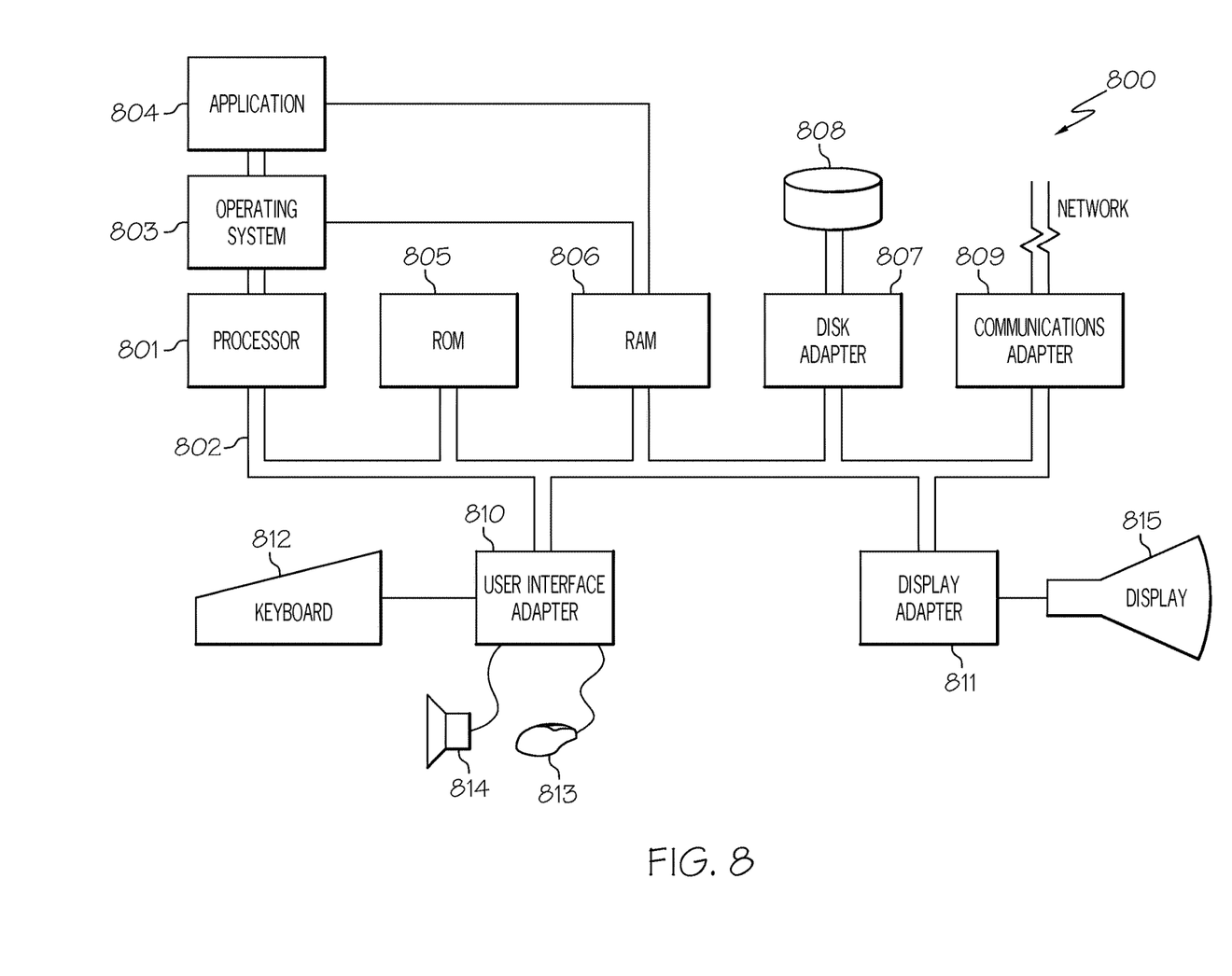
FIG. 8 depicts an embodiment of a hardware configuration of a computer system which is representative of a hardware environment for practicing the present invention.

FIG. 8 depicts an embodiment of a hardware configuration of a computer system 800 which is representative of a hardware environment for implementing data retrieval system 100 (FIG. 1). Referring to FIG. 8, computer system 800 has a processor 801 coupled to various other components by system bus 802. An operating system 803 may run on processor 801 and provide control and coordinate the functions of the various components of FIG. 8. An application 804 in accordance with the principles of the present invention may run in conjunction with operating system 803 and provide calls to operating system 803 where the calls implement the various functions or services to be performed by application 804. Application 804 may include, for example, an application for detecting and displaying potentially volatile data as discussed above; components of data retrieval system 100 as shown in FIG. 1.

Referring again to FIG. 8, read-only memory ("ROM") 805 may be coupled to system bus 802 and include a basic input/output system ("BIOS") that controls certain basic functions of computer device 800. Random access memory ("RAM") 806 and disk adapter 807 may also be coupled to system bus 802. It should be noted that software components including operating system 803 and application 804 may be loaded into RAM 806, which may be computer system's 800 main memory for execution. Disk adapter 807 may be an integrated drive electronics ("IDE") adapter that communicates with a disk unit 808, e.g., disk drive.

Computer system 800 may further include a communications adapter 809 coupled to bus 802. Communications adapter 809 may interconnect bus 802 with an outside network (not shown) thereby allowing computer system 800 to communicate with other similar devices.

I/O devices may also be connected to computer system 800 via a user interface adapter 810 and a display adapter 811. Keyboard 812, mouse 813 and speaker 814 may all be interconnected to bus 802 through user interface adapter 810. Data may be inputted to computer system 800 through any of these devices. A display monitor 815 (e.g., display 112 of FIG. 1) may be connected to system bus 802 by display adapter 811. In this manner, a user is capable of inputting to computer system 800 through keyboard 812 or mouse 813 and receiving output from computer system 800 via display 815 or speaker 814.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for addressing the problem where volatile data is retrieved at different points in time resulting in erroneous volatile data, the method comprising:
    retrieving a first set of data;
    retrieving a data time for each of said first set of data;
    displaying said first set of data on a first page on a user interface of a computing device;
    receiving a request to scroll said first set of data displayed on said first page on said user interface of said computing device;
    retrieving a second set of data in response to said request to scroll said first set of data displayed on said first page on said user interface of said computing device by paging said second set of data corresponding to back end data to help performance of said computing device, wherein said second set of data comprises data retrieved following retrieval of said first set of data;
    retrieving a data time for each of said second set of data;
    comparing, by a processor, said data time for each of said second set of data with respect to said data time for each of said first set of data to determine a relative age for each of said first and second sets of data;
    determining said relative age by storing an ordered map where a key entry is created for each fetch request, wherein each row of data points to a key in said ordered map;
    displaying data on a second page on said user interface of said computing device, wherein said data displayed on said second page on said user interface of said computing device comprises one or more rows of said first set of data and one or more rows of said second set of data; and
    displaying, by said processor, a decoration indicating said relative age for each row of said data displayed on said second page on said user interface of said computing device thereby allowing a user of said computing device to be aware of a mixed age of said data and to make a more informed decision about how different rows relate to each other with respect to data on those rows that can change over time and thereby helping said user of said computing device to determine which data might be inconsistent to either avoid making misinterpretations of said data or else having to fully refresh all of said data before making a decision thereby more efficiently utilizing resources of said computing device, wherein a first color is depicted on said decoration to indicate a most recent set of data, wherein a second color is depicted on said decoration to indicate an oldest set of data.

2. The method as recited in claim 1, wherein said data time comprises a time of retrieval.

3. The method as recited in claim 1, wherein said data time comprises a time of last update.

4. The method as recited in claim 1, wherein said decoration comprises a ruler.

5. The method as recited in claim 1 further comprising:
    providing said user an opportunity to determine whether said mixed age of data displayed on said second page on said user interface of said computing device is acceptable.

6. The method as recited in claim 5 further comprising:
    retrieving a third set of data to be displayed on a third page on said user interface of said computing device in response to said user indicating said mixed age of data is acceptable.

7. The method as recited in claim 5 further comprising:
    clearing and refreshing said data displayed on said second page on said user interface of said computing device in response to said user indicating said mixed age of data is not acceptable.

8. A computer program product for addressing the problem where volatile data is retrieved at different points in time resulting in erroneous volatile data, the computer program product comprising a non-transitory computer readable storage medium having program code embodied therewith, the program code comprising the programming instructions for:
    retrieving a first set of data;
    retrieving a data time for each of said first set of data;
    displaying said first set of data on a first page on a user interface of a computing device;
    receiving a request to scroll said first set of data displayed on said first page on said user interface of said computing device;
    retrieving a second set of data in response to said request to scroll said first set of data displayed on said first page on said user interface of said computing device by paging said second set of data corresponding to back end data to help performance of said computing device, wherein said second set of data comprises data retrieved following retrieval of said first set of data;
    retrieving a data time for each of said second set of data;
    comparing said data time for each of said second set of data with respect to said data time for each of said first set of data to determine a relative age for each of said first and second sets of data;
    determining said relative age by storing an ordered map where a key entry is created for each fetch request, wherein each row of data points to a key in said ordered map;
    displaying data on a second page on said user interface of said computing device, wherein said data displayed on said second page on said user interface of said computing device comprises one or more rows of said first set of data and one or more rows of said second set of data; and
    displaying a decoration indicating said relative age for each row of said data displayed on said second page on said user interface of said computing device thereby allowing a user of said computing device to be aware of a mixed age of said data and to make a more informed decision about how different rows relate to each other with respect to data on those rows that can change over time and thereby helping said user of said computing device to determine which data might be inconsistent to either avoid making misinterpretations of said data or else having to fully refresh all of said data before making a decision thereby more efficiently utilizing resources of said computing device, wherein a first color is depicted on said decoration to indicate a most recent set of data, wherein a second color is depicted on said decoration to indicate an oldest set of data.

9. The computer program product as recited in claim 8, wherein said data time comprises a time of retrieval.

10. The computer program product as recited in claim 8, wherein said data time comprises a time of last update.

11. The computer program product as recited in claim 8, wherein said decoration comprises a ruler.

12. The computer program product as recited in claim 8, wherein the program code further comprises the programming instructions for:
    providing said user an opportunity to determine whether said mixed age of data displayed on said second page on said user interface of said computing device is acceptable.

13. The computer program product as recited in claim 12, wherein the program code further comprises the programming instructions for:
    retrieving a third set of data to be displayed on a third page on said user interface of said computing device in response to said user indicating said mixed age of data is acceptable.

14. The computer program product as recited in claim 12, wherein the program code further comprises the programming instructions for:
    clearing and refreshing said data displayed on said second page on said user interface of said computing device in response to said user indicating said mixed age of data is not acceptable.

\* \* \* \* \*